(No Model.)
E. J. HART.
Gate.
No. 235,358.  Patented Dec. 14, 1880.
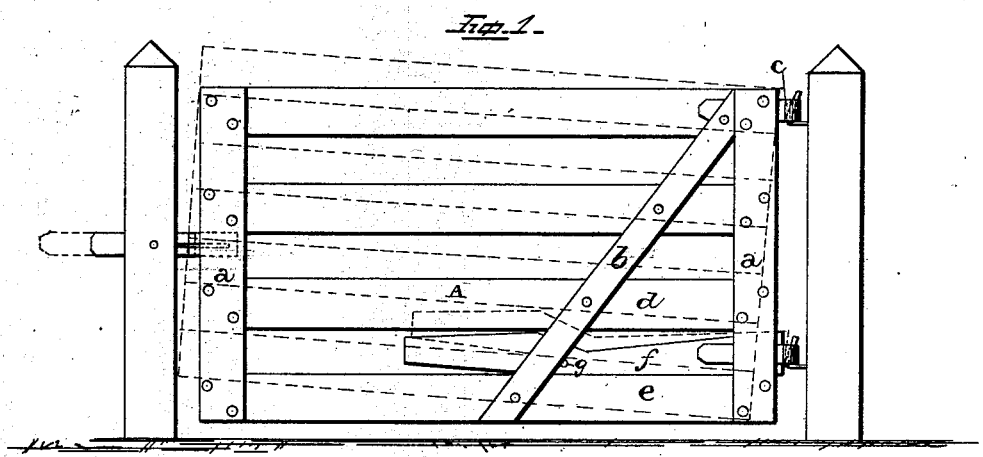
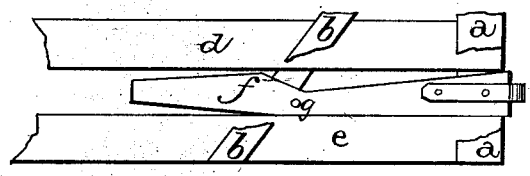
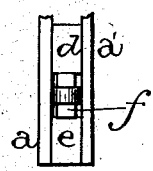
Witnesses:
Inventor:
E. J. Hart,
per
F. A. Lehmann
Atty

UNITED STATES PATENT OFFICE.

EDWIN J. HART, OF BUTLER, PENNSYLVANIA.

GATE.

SPECIFICATION forming part of Letters Patent No. 235,358, dated December 14, 1880.

Application filed May 10, 1880. (No model.)

*To all whom it may concern:*

Be it known that I, EDWIN J. HART, of Butler, in the county of Butler and State of Pennsylvania, have invented certain new and useful Improvements in Farm-Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in a simple arrangement by which the gate can be opened and shut in the usual manner, provided there be no impediments on the ground to prevent it, and to be raised to overcome obstructions if there be any, as will be fully described hereinafter.

The accompanying drawings represent my invention.

Figure 1 is a side elevation of a gate embodying my invention. Fig. 2 is a detail side view having portions broken away. Fig. 3 is a detail edge view.

A represents a farm-gate, the bars of which are rigidly confined between two vertical uprights, $a\ a'$, at each end to prevent sagging, and braced by pieces $b$, of which there is one at each side.

The upper hinge, $c$, upon which the gate swings, is of the usual form, and attached to the gate-post at a place opposite its top bar. The eye of this hinge is slightly larger than is strictly necessary for the gate to turn, so that when the gate is lifted up at the opposite side there is no danger of wrenching or straining the hinge; or a strap-hinge attached to the outside of the post may be used when the gate is only to open in one direction.

Between the two lowest bars, $d\ e$, of the gate is introduced a bar, $f$, entering from the side near the gate-post, between the vertical bars $a$, and extending beyond the foot of the braces $b$. To the rear end of this bar $f$ is fastened the lower hinge of the gate, the hinge being of the same form as the upper one.

The bar $f$ is not fastened, but simply guided by the vertical pieces at the end of the gate and the braces $b$ when sliding back and forth while the opposite end of the gate is raised up. A pin, $g$, projecting from both sides of the bar $f$, bears against the under side of the braces $b$ when the gate is horizontal, and upholds it in that position.

The gate swings like any ordinary gate to either side, and can be latched or locked in any suitable manner; but should there be an impediment upon the ground, such as deep snow, the end of the gate at the side of the latch is to be raised up to the required height to pass over the obstruction and again dropped down to its former position. When the gate is raised for the purpose of avoiding obstacles, the bar $f$, being attached to the post by the hinge, remains stationary and holds the gate in a vertical position.

Instead of the wooden bar $f$, an iron rod with suitable guides may be substituted therefor.

I am aware that a gate in which all of the parts are pivoted together, so that the gate can be raised upward at one end, and which is supported at its upper corner by a jointed iron rod that is fastened to the gate at its outer end, is not new, and this I disclaim.

In my gate the parts are all rigidly secured together, and, instead of being supported upon a rod which is jointed and secured to the gate at one of its ends, my gate slides outward upon a bar which simply projects in between two of the panels. By dispensing with the pivots and a jointed rod the construction of the gate is greatly cheapened.

Having thus described my invention, I claim—

In a gate, the combination of the gate, the posts upon which the gate is hung and against which it closes, and the bar $f$, to which the lower hinge of the gate is secured at one end, and which bar is inserted between the two lower panels of the gate, but not fastened to or connected with the gate, and which is provided with a stop to limit the downward movement of the gate, substantially as shown.

In testimony that I claim the foregoing I have hereunto set my hand this 15th day of March, 1880.

EDWIN J. HART.

Witnesses:
WM. A. SCOTT,
T. F. LEHMANN.